Dec. 11, 1923.
W. A. LESLIE
IMPLEMENT POLE
Filed May 10, 1922
1,476,720
2 Sheets-Sheet 1
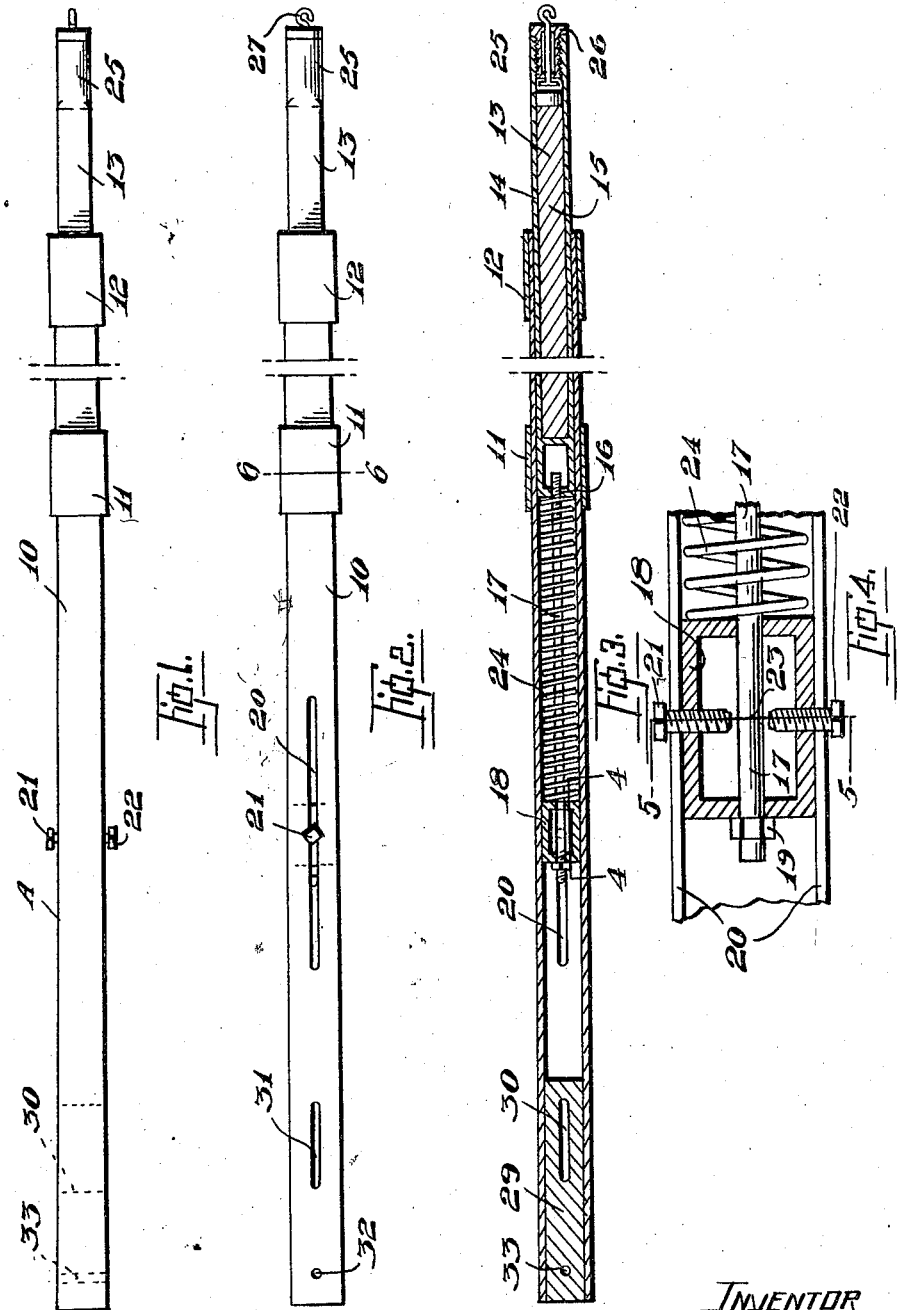
INVENTOR
WILLIAM. A. LESLIE.
BY Fetherstonhaugh & Co.
ATTYS.

Dec. 11, 1923.
W. A. LESLIE
IMPLEMENT POLE
Filed May 10, 1922
1,476,720
2 Sheets-Sheet 2
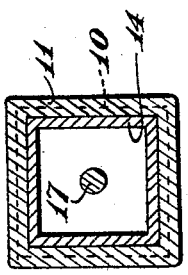
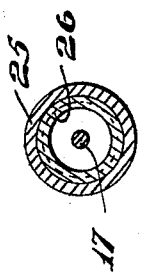
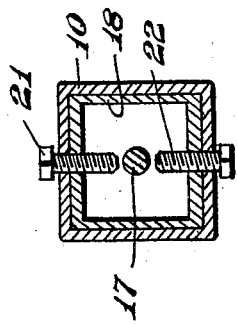
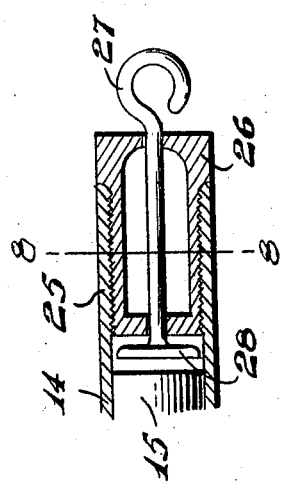
INVENTOR
WILLIAM. A. LESLIE.
BY Fetherstonhaugh&Co.
ATTYS Patented Dec. 11, 1923.

1,476,720

UNITED STATES PATENT OFFICE.

WILLIAM ALEXANDER LESLIE, OF ASQUITH, SASKATCHEWAN, CANADA.

IMPLEMENT POLE.

Application filed May 10, 1922. Serial No. 559,888.

*To all whom it may concern:*

Be it known that I, WILLIAM ALEXANDER LESLIE, a subject of the King of Great Britain, and resident of Asquith, in the Province of Saskatchewan, Dominion of Canada, have invented certain new and useful Improvements in Implement Poles, of which the following is a specification.

This invention relates to improvements in implement poles, and has for its objects to provide a pole that can be suitably extended, to provide a pole having a slidable extension, the longitudinal movement of which is controlled by resilient means.

Further objects are to provide an implement pole of adjustable length, to provide a swivel eye on the slidable adjustment of the pole whereby any make of neck yoke can be attached thereto, to provide a pole which consists of a hollow shank in which a slidable hollow metal shank covering a wooden core and provided with a partly threaded rod extending through the block fastened to the inside of the hollow shank and adjusted thereto by means of a nut, to provide also resilient means located between the slidable member and the block within the hollow shank.

Other objects are to provide an implement pole that is simple in construction, and not liable to go out of repair, and generally to adapt the several parts to better perform the functions required of them.

With the above and other objects in view, the invention consists essentially of the improved construction, hereinafter described in detail in the accompanying specification and drawings.

In the drawings:

Figure 1 is a side elevation of the improved implement pole.

Figure 2 is a plan view of the same.

Figure 3 is a longitudinal section of the implement pole.

Figure 4 is an enlarged section on the line 4—4 of Figure 3.

Figure 5 is an enlarged section on the line 5—5 of Figure 4.

Figure 6 is an enlarged sectional view on the line 6—6 of Figure 2.

Figure 7 is an enlarged sectional detail through the front end of the slidable extension.

Figure 8 is a cross section on the line 8—8 of Figure 7.

Like characters of reference indicate corresponding parts in all the figures.

Referring to the drawings, A represents the improved implement pole comprising a hollow metal shank 10, preferably square in cross section and formed at one end and approximately intermediate of its length with collars 11 and 12 suitably welded thereon.

In the front end of the hollow metal shank 10 is slidably mounted an extension 13 consisting of a metal shank 14 square in cross section and reinforced with a wooden core 15.

The rear end of the slidable extension 13 is formed with a threaded bore 16, which readily engages the screw threaded end of a rod 17 extending therefrom within the hollow shank 10.

Mounted within the shank 10 adjacent the rear end thereof is a hollow block 18 through which the rod 17 extends and to which the said rod is fastened by means of an adjustable nut 19 bearing against the rear face of the said block.

Adjacent the place occupied by the block 18 in the side walls of the metal shank 10 are two longitudinal slots 20 through which cap screws 21 and 22 extend.

The cap screws 21 and 22 are in threaded engagement with the block 18. By this arrangement the longitudinal movement of the extension 13 will be controlled and the same will not be free of longer movement than the length of the slots 20 through which the cap screws 21 and 22 engaging with the rod are adapted to slide.

Between the block 18 and the rear end of the slidable extension 13 a spring 24 is provided which is coiled around the rod 17 and bears against the block 18 and the rear face of the extension 13.

The compression and expansion of the springs 24 will offer suitable resistance to the rearward or forward movement of the slidable extension 13 within the shank 10. The forward end of the slidable extension 13 is formed with a cylindrical extension 25 screw threaded internally and provided with a bushing 26 through which the slidably mounted swivel eye 27, the shank of which is formed at its inner end with a disc 28 adapted to bear against the forward end of the wooden core 15, thus limiting the longitudinal movement of the swivel eye 27. This swivel eye 27 is designed to engage the neck yoke and the front of the pole A.

The rear end of the metal pole 10 is provided with a wooden plug 29 formed with a slot 30 designed to register with slots 31 provided on the top of the shank 10.

Adjacent its rear end the shank 10 is also provided on its two walls with orifices 32 designed to register with an orifice 33 bored through the wooden plug 29 and designed to engage the bolt fastening the pole to the front truck of the implement.

When this implement pole is used, the required length of the pole may be adjusted by the adjustment of the cap screws 21 and 22, thereby freeing the block 18 and permitting free movement of same, the rod 17, the spring 24, the bore 16, and the slidable extension 13, within the hollow metal shank 10, and thereby adjusting the rearward and forward movement of the slidable member 13.

A strain exerted by the charge of the implement on the pole will be taken up and lessened by the spring 27, which will be compressed up in rearward movement of the member 13.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. An implement pole comprising a hollow metal shank, a slidably mounted extension therein having its inner end threaded, a rod for said threaded end, a block in the shank connected to the other end of said rod and spring actuating means wound on said rod, slots in the shank and adjusting means extending through said slots to engage with the block whereby longitudinal movement of the extension is controlled.

2. In a device of the character described, the combination with a hollow shank, of a slidably operable extension in said shank, an adjustable block in said shank and rod means connecting the block with said extension, spring actuating means on said rod and slot means in the shank adapted to receive adjusting means for the block.

In witness whereof I have hereunto set my hand in the presence of a witness.

WILLIAM ALEXANDER LESLIE.

Witness:
RAY LANE KLAHOLZ.